United States Patent
Sakoda et al.

(10) Patent No.: US 11,706,661 B2
(45) Date of Patent: Jul. 18, 2023

(54) WIRELESS COMMUNICATION DEVICE, WIRELESS COMMUNICATION SYSTEM, AND COMPUTER PROGRAM PRODUCT

(71) Applicant: KABUSHIKI KAISHA TOSHIBA, Tokyo (JP)

(72) Inventors: Takeshi Sakoda, Tokyo (JP); Yasuyuki Tanaka, Kanagawa (JP); Toshio Ito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 17/181,540

(22) Filed: Feb. 22, 2021

(65) Prior Publication Data
US 2022/0086687 A1 Mar. 17, 2022

(30) Foreign Application Priority Data
Sep. 14, 2020 (JP) .................. 2020-153439

(51) Int. Cl.
H04J 3/14 (2006.01)
H04W 28/02 (2009.01)
H04W 4/06 (2009.01)

(52) U.S. Cl.
CPC ......... *H04W 28/0289* (2013.01); *H04W 4/06* (2013.01)

(58) Field of Classification Search
CPC ........................ H04W 28/0289; H04W 4/06
USPC ................................. 370/235, 235.1
See application file for complete search history.

(56) References Cited

U.S. PATENT DOCUMENTS

| 2016/0218943 | A1* | 7/2016 | Djukic | H04L 43/0894 |
| 2017/0048153 | A1* | 2/2017 | Feng | H04L 47/2441 |
| 2017/0222881 | A1* | 8/2017 | Holbrook | H04L 43/0876 |
| 2019/0149450 | A1* | 5/2019 | Long | H04L 45/124 |
| | | | | 370/422 |
| 2020/0127911 | A1* | 4/2020 | Gilson | H04L 47/323 |
| 2020/0153739 | A1* | 5/2020 | Gafni | H04L 47/623 |
| 2021/0029041 | A1* | 1/2021 | Yuan | H04L 47/125 |

FOREIGN PATENT DOCUMENTS

JP 6304993 B2 4/2018

OTHER PUBLICATIONS

J. Hui et al., "Multicast Protocol for Low-Power and Lossy Networks (MPL)," IETF RFC 7731, 29 pages (2016).

* cited by examiner

*Primary Examiner* — Chuong T Ho
(74) *Attorney, Agent, or Firm* — Finnegan, Henderson, Farabow, Garrett & Dunner, LLP (57) ABSTRACT

A wireless communication device according to an embodiment includes one or more hardware processors. The one or more hardware processors: collect forwarding load information about wireless communications in a wireless multi-hop network; determine, based on the forwarding load information, a degree of forwarding priority for a packet corresponding to a forwarding determination target; perform a forwarding control such that the packet corresponding to the forwarding determination target is forwarded earlier as the degree of forwarding priority is higher; and, when the packet corresponding to the forwarding determination target is forwarded, transmit the packet corresponding to the forwarding determination target by multi-cast communications or broadcast communications.

9 Claims, 10 Drawing Sheets

WIRELESS COMMUNICATION DEVICE, WIRELESS COMMUNICATION SYSTEM, AND COMPUTER PROGRAM PRODUCT

CROSS-REFERENCE TO RELATED APPLICATIONS

This application is based upon and claims the benefit of priority from Japanese Patent Application No. 2020-153439, filed on Sep. 14, 2020; the entire contents of which are incorporated herein by reference.

FIELD

Embodiments described herein relate generally to a wireless communication device, a wireless communication system, a wireless communication method, and a computer program product.

BACKGROUND

A wireless multi-hop network in which data sensing takes place to collect data has been conventionally known. For example, when a problem arises in one of nodes being operated or in firmware (FW) being executed in one of the nodes in a wireless meshed network such as a smart meter communication system, typically, it is necessary that the FW be updated promptly for all the nodes without interrupting collecting of meter data and other data.

However, with conventional arts, it is difficult to autonomously disperse the forwarding load in wireless communications without concentrating in a single node.

DETAILED DESCRIPTION

A wireless communication device according to an embodiment includes one or more hardware processors. The one or more hardware processors are configured to: collect forwarding load information about wireless communications in a wireless multi-hop network; determine, based on the forwarding load information, a degree of forwarding priority for a packet corresponding to a forwarding determination target; perform a forwarding control such that the packet corresponding to the forwarding determination target is forwarded earlier as the degree of forwarding priority is higher; and, when the packet corresponding to the forwarding determination target is forwarded, transmit the packet corresponding to the forwarding determination target by multi-cast communications or broadcast communications.

Embodiments of a wireless communication device, a wireless communication system, a wireless communication method, and a computer program product will now be described in detail with reference to the accompanying drawings.

First Embodiment

An example of a device configuration of a wireless communication system 100 according to a first embodiment will first be described.

Example of Device Configuration

Figure 1:
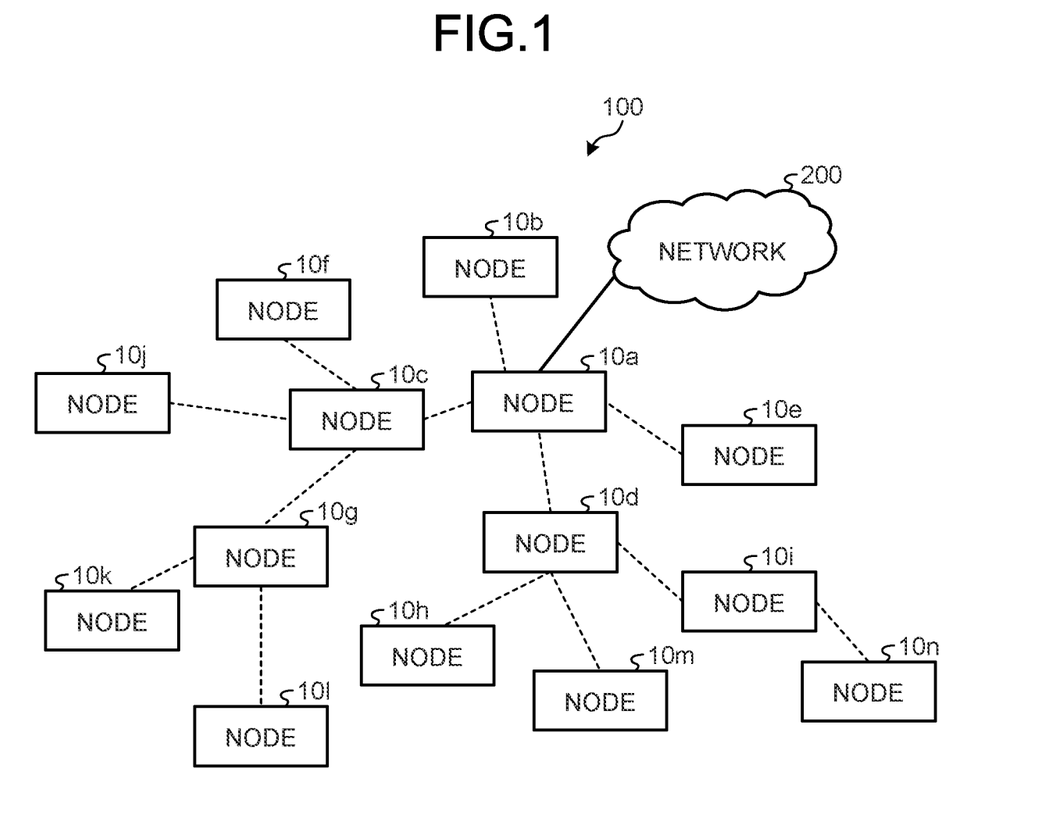
FIG. 1 is a diagram illustrating an example of a device configuration of a wireless communication system according to a first embodiment.

FIG. 1 is a diagram illustrating an example of the device configuration of the wireless communication system 100 according to the first embodiment. The wireless communication system 100 according to the first embodiment includes nodes 10a to 10n and a network 200.

The nodes 10a to 10n are wireless communication devices constituting a wireless multi-hop network. Dotted lines in FIG. 1 represent wireless links. A connection relation among the dotted lines represents a routing tree that the nodes 10a to 10n construct. Note that a topology of the wireless multi-hop network may have a desired shape such as a tree structure or a full-mesh or star type.

The nodes 10a to 10n will be herein simply referred to as the nodes 10 or the wireless communication devices 10, unless otherwise distinguished from each other. When one node is connected with another node 10 that lies in an immediately higher layer in the routing tree than a layer in which the one node lies, the other node 10 is referred to as a parent node for the one node. When the node is connected with another node 10 that lies in an immediately lower layer in the routing tree than the layer in which the one node lies, the other node 10 is referred to as a child node for the one node. For example, the node 10d serves as a parent node for the node 10i, whereas the node 10n serves as a child node for the node 10i.

The node 10a is connected to the network 200, in addition to the wireless links to the nodes around the node 10a. Typically, the network 200 is the Internet. The node 10a operates as a router (aggregation device) that connects the network 200 and the wireless multi-hop network constituted by the nodes 10a to 10n. Note that the node 10a may not necessarily be connected to the network 200.

In the wireless multi-hop network constituted by the nodes 10a to 10n, there are wireless communications in an upward direction and wireless communications in a downward direction. The wireless communications in the upward direction are wireless communications heading toward the node 10a. Data to be transmitted by wireless communications in the upward direction includes, for example, meter data that the nodes 10 collect. The wireless communications in the downward direction are wireless communications heading away from the node 10a. Data to be transmitted by wireless communications in the downward direction includes, for example, update data for the FW installed in each of the nodes 10.

Example of Functional Configuration

Figure 2:
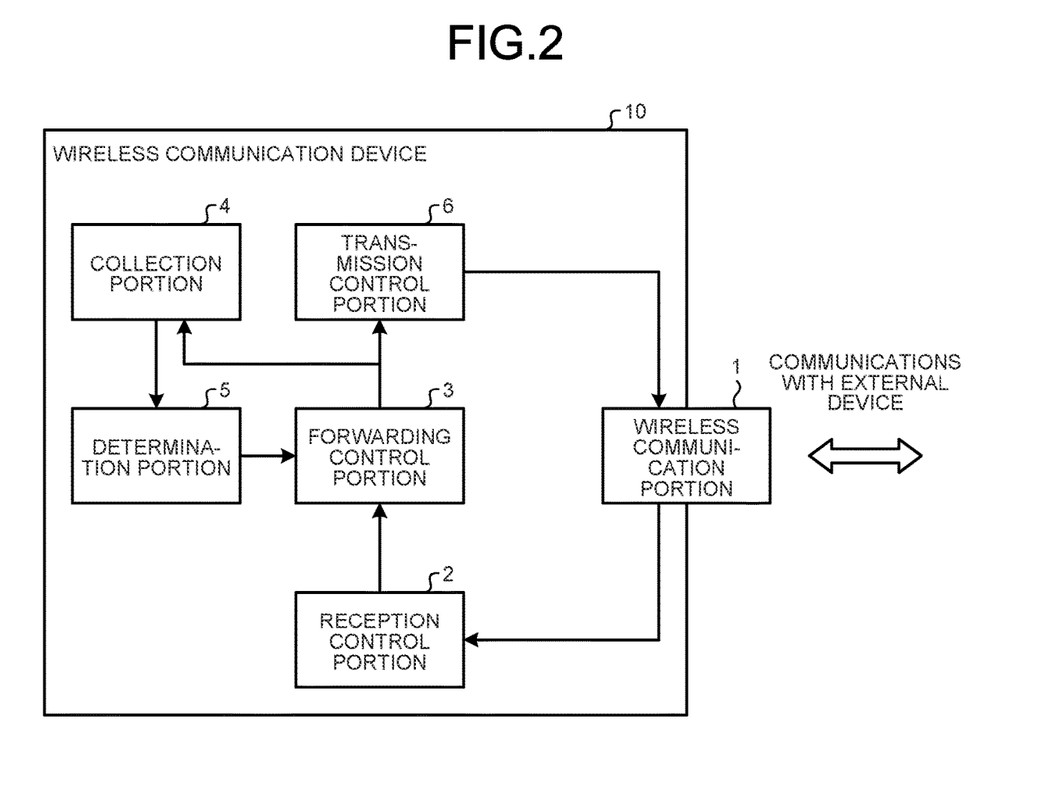
FIG. 2 is a diagram illustrating an example of a functional configuration of a wireless communication device according to the first embodiment.

FIG. 2 is a diagram illustrating an example of a functional configuration of the wireless communication device 10 according to the first embodiment. The wireless communication device 10 according to the first embodiment includes a wireless communication portion 1, a reception control portion 2, a forwarding control portion 3, a collection portion 4, a determination portion 5, and a transmission control portion 6.

The wireless communication portion 1 is configured to perform wireless communications with the other wireless communication devices 10. Upon the acceptance of a packet from the transmission control portion 6, the wireless communication portion 1 transmits the packet. Upon the reception of a packet from one of the other wireless communication devices 10, the wireless communication portion 1 inputs the packet to the reception control portion 2.

The reception control portion 2 is configured to accept a packet received from the wireless communication portion 1, and to input the packet to the forwarding control portion 3.

The forwarding control portion 3 is configured to perform a packet forwarding control. Details of the packet forwarding control will be described later with reference to FIG. 4.

The collection portion 4 is configured to collect forwarding load information that is not dependent on the directions of communications (upward/downward). The collection portion 4 according to the first embodiment stores, as the forwarding load information, a forwarding count of packets received from the other wireless communication devices 10, among packets that the transmission control portion 6 transmits.

The determination portion 5 is configured to be operated at regular intervals to determine a degree of forwarding priority based on the forwarding count that the collection portion 4 has stored. Then, the determination portion 5 sets the degree of forwarding priority in the forwarding control portion 3. The determination portion 5 determines the degree of forwarding priority for its own node to be low, when the packet forwarding count is greater. A specific example of determining the degree of forwarding priority will be described later with reference to FIG. 3.

The transmission control portion 6 is configured to perform a packet transmission control. The transmission control portion 6 performs the transmission control for a packet (a packet received from another one of the nodes) that the forwarding control portion 3 has input. The transmission control portion 6 performs the transmission control for a packet including data (for example, meter data) that its own node has acquired.

The transmission control portion 6 limits packets to be transmitted within a certain period of time, based on a transmission time limit. The transmission time limit is specified based on laws and regulations regarding wireless communications, for example.

Example of Wireless Communication Method

Figure 3:
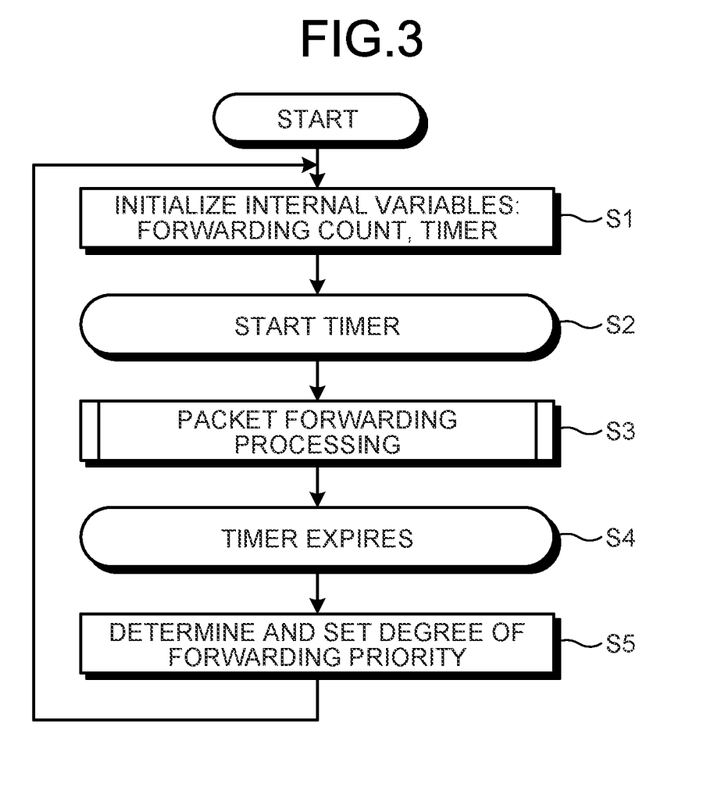
FIG. 3 is a flowchart illustrating an example of an overall flow of a wireless communication method according to the first embodiment.

FIG. 3 is a flowchart illustrating an example of an overall flow of a wireless communication method according to the first embodiment. The collection portion 4 initializes a counter that stores a forwarding count, and also initializes a timer for operating (activating) the determination portion 5 (Step S1). Next, the collection portion 4 resets the timer initialized under the processing at Step S1, and starts the timer to measure a predetermined period of time (Step S2).

Next, the reception control portion 2, the forwarding control portion 3, and the transmission control portion 6 perform packet forwarding processing based on a degree of forwarding priority X (Step S3). Details of the processing at Step S3 will be described later with reference to FIG. 4.

Next, after the timer that has started under the processing at Step S2 expires (Step S4), the determination portion 5 determines the degree of forwarding priority X based on the forwarding count counted within the period of time that the timer has set, and sets the degree of forwarding priority X in the forwarding control portion 3 (Step S5). At this time, the degree of forwarding priority X is calculated in proportion to the forwarding count, with an equation (1) illustrated below, for example.

$$X = \alpha \times \text{Forwarding count} \qquad (1)$$

Optionally setting a value of $\alpha$ makes it possible to set a desired range of degrees of forwarding priority. After the processing at Step S5, the processing flow returns to the processing at Step S1.

Next, the processing (Step S3) during the forwarding processing in FIG. 3 will be described.

Figure 4:
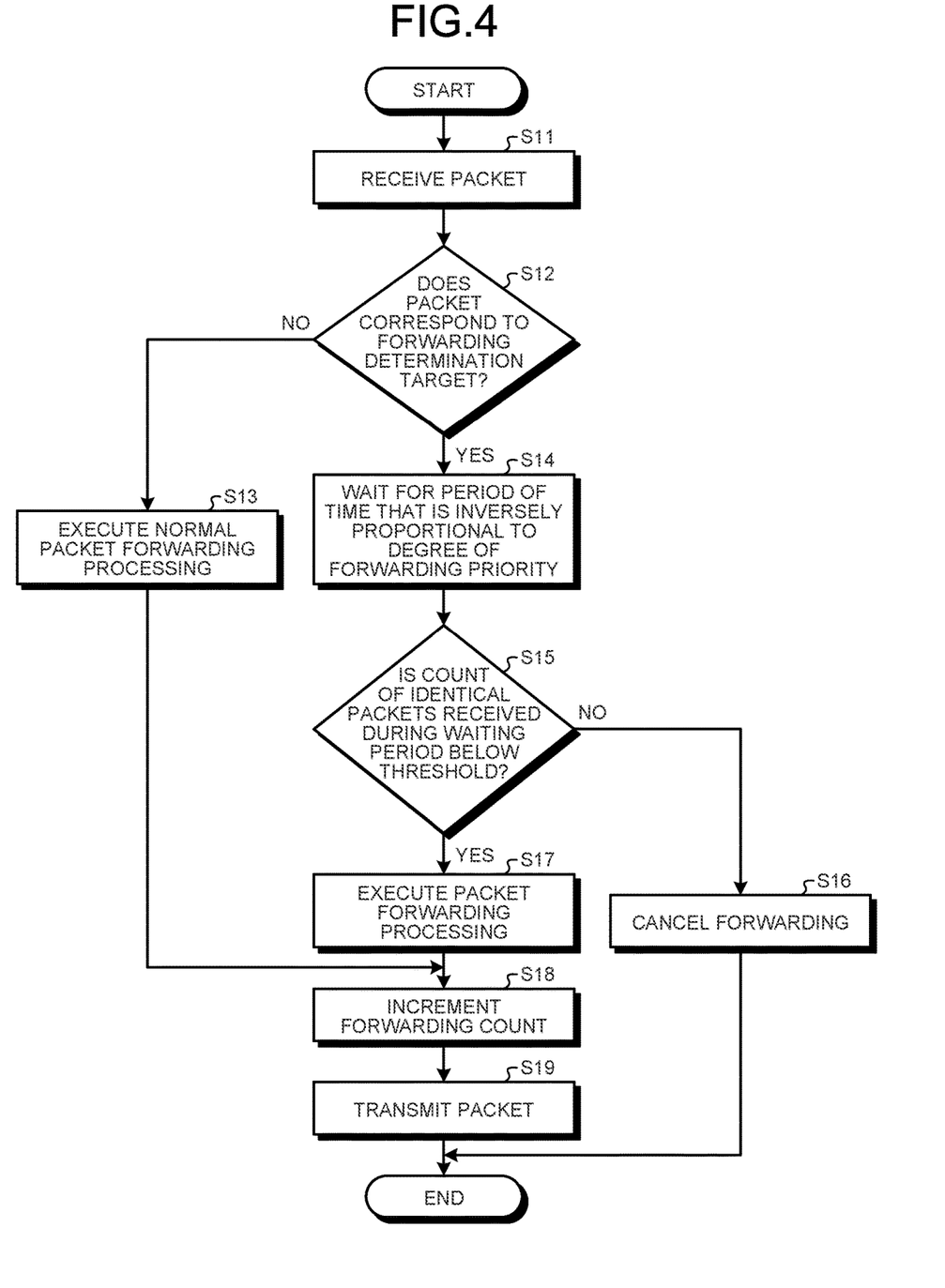
FIG. 4 is a flowchart illustrating details of the processing at Step S3, according to the first embodiment.

FIG. 4 is a flowchart illustrating the details of the processing at Step S3. The reception control portion 2 first receives a packet via the wireless communication portion 1 (Step S11).

Next, the forwarding control portion 3 determines whether the packet received under the processing at Step S11 is a packet corresponding to a forwarding determination target (a packet that undergoes a forwarding determination based on the degree of forwarding priority X) (Step S12). The packet corresponding to the forwarding determination target is a packet to be transmitted by multi-cast communications or broadcast communications in a predetermined communication direction (downward direction or upward direction), for example. Specifically, the packet corresponding to the forwarding determination target is, for example, a packet to be transmitted by multi-cast communications in the downward direction. A packet to be transmitted by multi-cast communications in the downward direction is a packet including update data for the FW installed in the wireless communication device 10, for example.

When the packet does not correspond to the forwarding determination target (No at Step S12), the forwarding control portion 3 executes the normal packet forwarding processing where the forwarding control portion 3 does not hold forwarding (Step S13) to proceed to the processing at Step S18. The packet forwarding processing is the processing of forwarding a packet to its default gateway terminal (parent node) when a destination is not its own node. The packet forwarding processing sets, for example, a receiver's Media Access Control (MAC) address and a sender's MAC address of a wireless frame to which a packet is to be forwarded.

On the other hand, when the packet corresponds to the forwarding determination target (Yes at Step S12), the forwarding control portion 3 waits for a period of time that is inversely proportional to the degree of forwarding priority (Step S14). That is, the forwarding control portion 3 holds the forwarding of the packet corresponding to the forwarding determination target for long time as the degree of forwarding priority is low.

Next, the forwarding control portion 3 determines whether a count of identical packets (packets with payloads each identical to a payload included in the packet corresponding to the forwarding determination target) received while holding the forwarding of the packet corresponding to the forwarding determination target is below a threshold (Step S15). When the count of identical packets received while holding the forwarding is equal to or above the threshold (No at Step S15), the forwarding control portion 3 cancels the forwarding of the packet corresponding to the forwarding determination target (Step S16).

When the count of the identical packets received while holding the forwarding is below the threshold (Yes at Step S15), the packet forwarding processing is executed (Step S17).

Next, the collection portion 4 increments the counter storing the forwarding count indicating the count at which the transmission control portion 6 has forwarded packets (Step S18). Next, the transmission control portion 6 transmits the packet via the wireless communication portion 1 (Step S19). The transmission control portion 6 transmits the packet by multi-cast communications or broadcast communications, for example.

The processing in the flowchart in FIGS. 3 and 4 described above makes it possible to achieve a dispersed load of the forwarding processing, where a forwarding timing is delayed in the wireless communication device 10 in which the forwarding count is greater, resulting in that the forwarding is canceled.

As described above, in the wireless communication device 10 according to the first embodiment, the collection portion 4 collects the forwarding load information about wireless communications in the wireless multi-hop network. The determination portion 5 determines a degree of forwarding priority for a packet corresponding to a forwarding determination target, based on the forwarding load information. The forwarding control portion 3 performs the forwarding control such that the packet corresponding to the forwarding determination target is forwarded earlier as the degree of forwarding priority is higher. The transmission control portion 6 then transmits, when the packet corresponding to the forwarding determination target is to be forwarded, the packet corresponding to the forwarding determination target by multi-cast communications or broadcast communications.

The wireless communication device (node) 10 according to the first embodiment makes it possible to autonomously disperse the forwarding load in wireless communications without concentrating in a single one of the nodes 10.

For example, it is possible to utilize the wireless communication device (node) 10 according to the first embodiment in a smart meter communication system where communications for collecting data and communications for distributing FW arise. To update FW in the nodes 10, a method of updating, in a wired manner, the FW in each of the nodes 10 is not realistic particularly in a smart meter communication system where several million of nodes are deployed, for example. Such a method has conventionally been therefore employed that uses, to distribute FW data, downward communications in a large-scale wireless multi-hop network constructed to collect meter data. When a wireless band is excessively used to distribute FW data, however, it becomes impossible to collect meter data. Therefore, such a method has currently been applied that uses a narrowed band for distributing FW data and spends several days to update FW.

On the other hand, by employing the wireless communication system 100 including the wireless communication devices (nodes) 10 according to the first embodiment, the wireless communication devices 10 each determine in an autonomous and dispersed manner the forwarding load (that is, determine whether a communication band is utilized to collect sensing data), based on the forwarding count, further promptly distributing FW, in a priority manner, to each of the nodes 10, which is not using the communication band. It is therefore possible to shorten a time for distributing FW.

In the wireless communication system 100 according to the first embodiment, it is possible to autonomously disperse the forwarding load by the wireless communication devices 10, preventing, from increasing, traffics with which the forwarding count is periodically notified to the other peripheral wireless communication devices 10, for example. It is therefore possible to control a transmission time to prevent the wireless communication devices 10 from performing communications exceeding the transmission time limit specified by the laws and regulations regarding wireless communications, for example.

Second Embodiment

Next, a second embodiment will be described. In the description of the second embodiment, those similar to the first embodiment are omitted, but differences from the first embodiment are described. In the second embodiment, a transmission count of packets in an IP layer, which include packets other than packets received from the other wireless communication devices 10, is collected as forwarding load information.

Example of Functional Configuration

Figure 5:
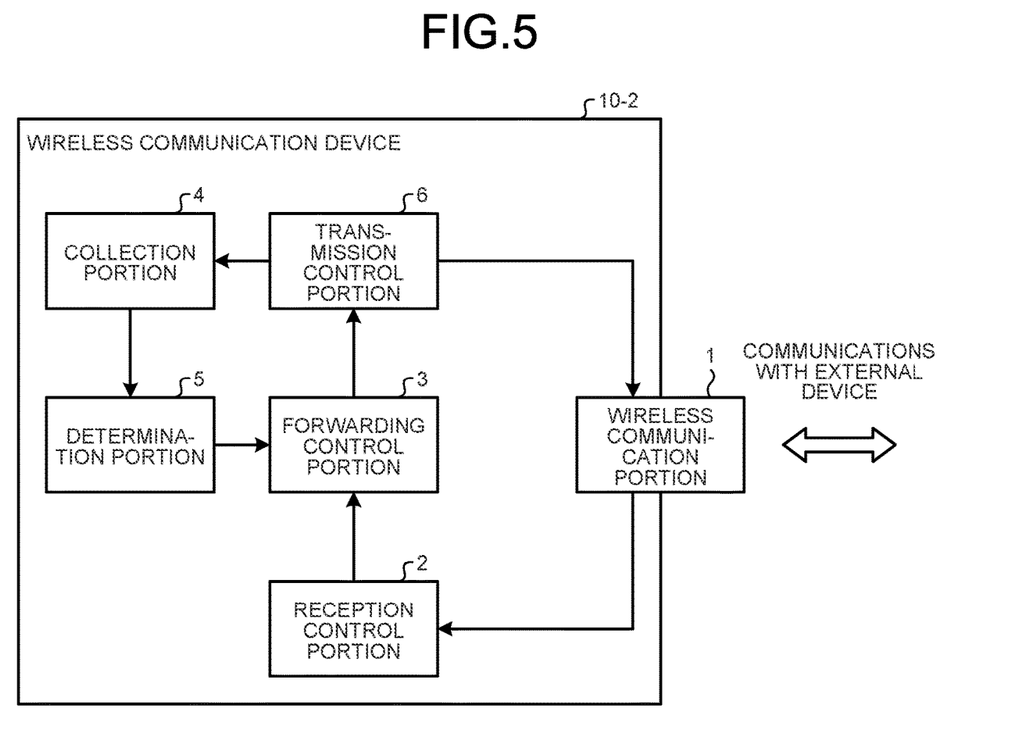
FIG. 5 is a diagram illustrating an example of a functional configuration of a wireless communication device according to a second embodiment.

FIG. 5 is a diagram illustrating an example of a functional configuration of a wireless communication device 10-2 according to the second embodiment. The wireless communication device 10-2 according to the second embodiment includes the wireless communication portion 1, the reception control portion 2, the forwarding control portion 3, the collection portion 4, the determination portion 5, and the transmission control portion 6.

The collection portion 4 according to the second embodiment counts a packet transmission count for a predetermined period of time in the wireless communication device 10 to collect the packet transmission count as forwarding load information. The determination portion 5 according to the second embodiment determines to lower the degree of forwarding priority for its own node as the packet transmission count is greater, for example.

Example of Wireless Communication Method

The description of an overall flow of a wireless communication method according to the second embodiment is similar to the description of the overall flow of the wireless communication method according to the first embodiment (see FIG. 3). In the second embodiment, however, the counter that the collection portion 4 has used to store a forwarding count of packets received from the other wireless communication devices 10 stores a transmission count of desired packets transmitted from the other wireless communication devices 10.

Figure 6:
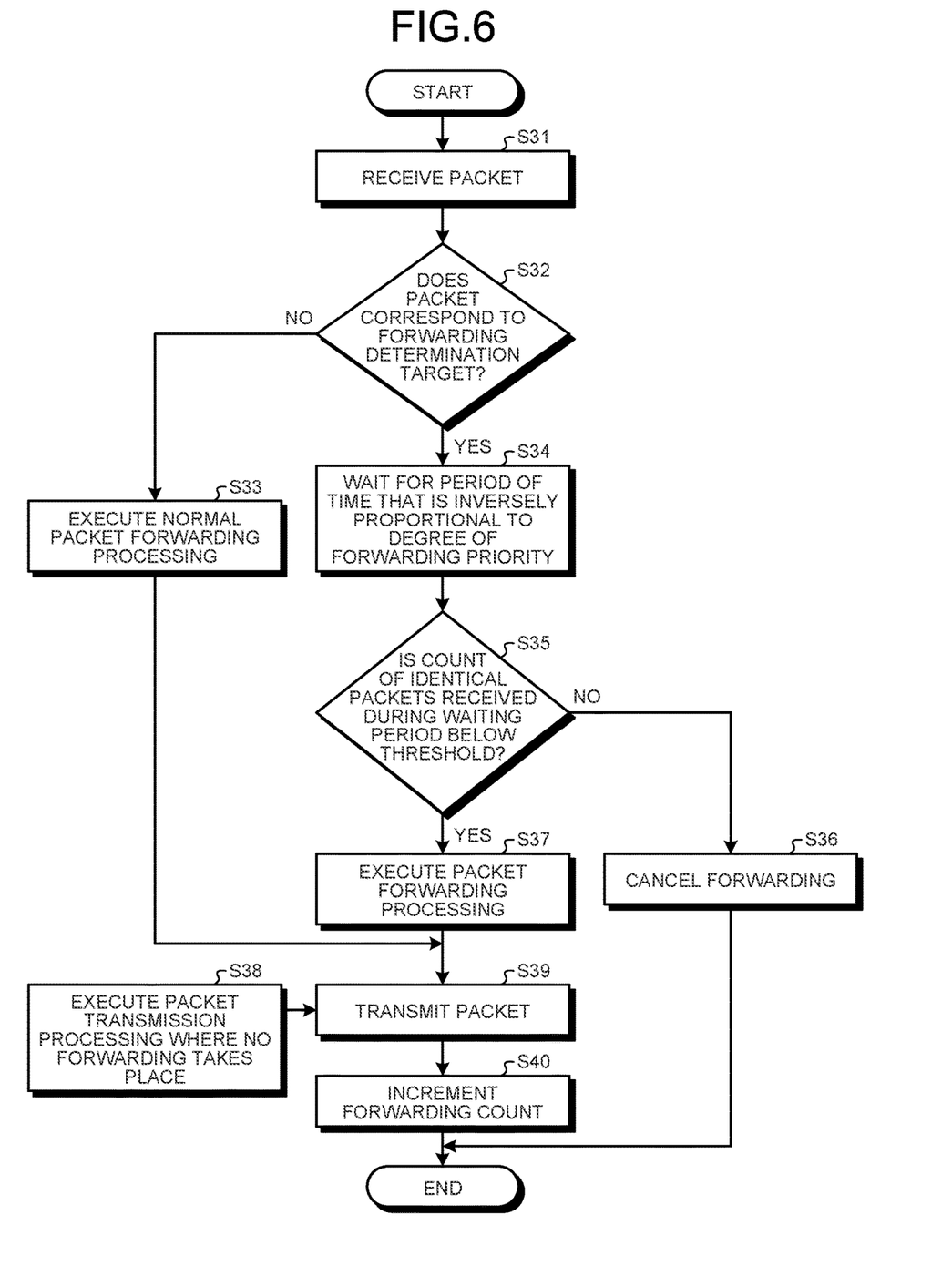
FIG. 6 is a flowchart illustrating details of the processing at Step S3, according to the second embodiment.

FIG. 6 is a flowchart illustrating the details of the processing at Step S3, according to the second embodiment. The descriptions of Steps S31 to S37 are similar to the descriptions of the Steps S11 to S17 according to the first embodiment, and are thus omitted.

The transmission control portion 6 executes packet transmission processing where no forwarding takes place (Step S38). The packet transmission processing where no forwarding takes place refers to processing of transmitting packets including data (for example, meter data) that its own node has collected, for example.

Next, the transmission control portion 6 transmits the packets via the wireless communication portion 1 (Step S39). Next, the collection portion 4 increments the counter that stores the transmission count that indicates the count at which the transmission control portion 6 has transmitted the packets (Step S40). The transmission count according to the second embodiment includes not only a forwarding count according to the first embodiment, but also a packet transmission count under the execution of the packet transmission processing where no forwarding takes place (Step S38).

Even though a forwarding count of forwarded packets is counted in the first embodiment, as described above, a transmission count of desired packets that the wireless communication device 10 transmits is counted in the second embodiment. It is therefore possible to calculate a degree of forwarding priority in accordance with an actual transmission time in the wireless communication device 10, improving the dispersing efficiency of dispersing loads.

Third Embodiment

Next, a third embodiment will be described. In the description of the third embodiment, those similar to the first embodiment are omitted, but differences from the first embodiment are described. In the third embodiment, the collection portion 4 uses not only a forwarding count, but also route information, to collect forwarding load information.

Example of Functional Configuration

Figure 7:
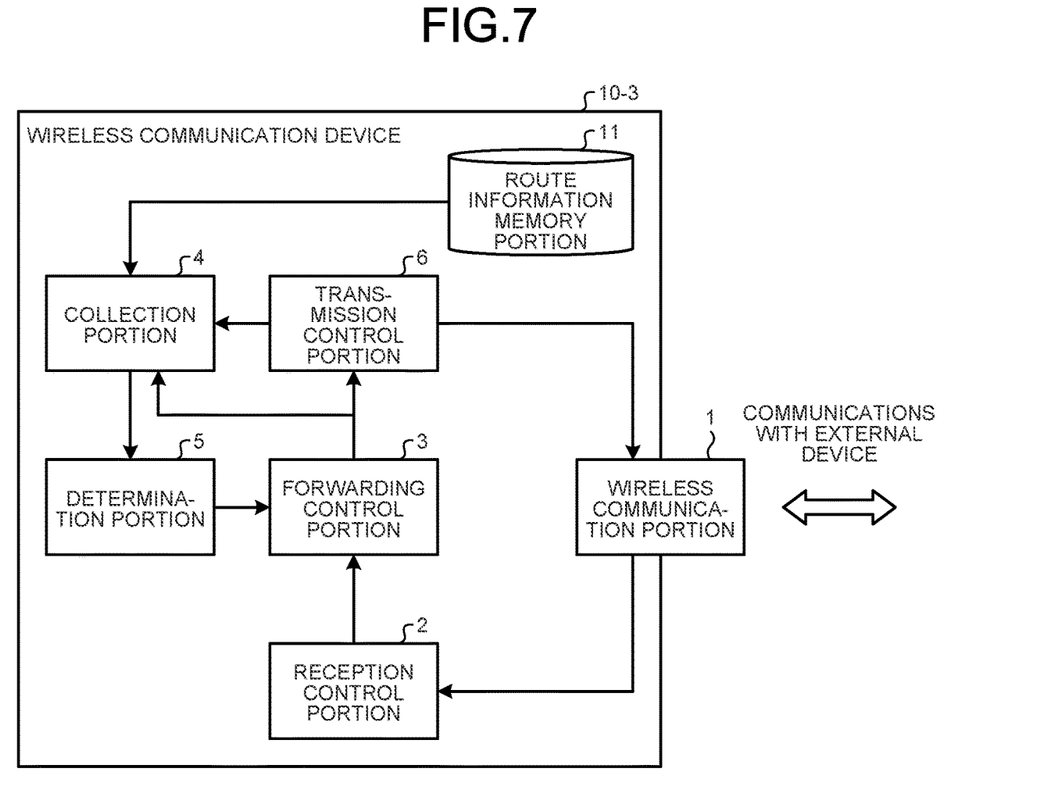
FIG. 7 is a diagram illustrating an example of a functional configuration of a wireless communication device according to a third embodiment.

FIG. 7 is a diagram illustrating an example of a functional configuration of a wireless communication device 10-3 according to the third embodiment. The wireless communication device 10-3 according to the third embodiment includes the wireless communication portion 1, the reception control portion 2, the forwarding control portion 3, the collection portion 4, the determination portion 5, the transmission control portion 6, and a route information memory portion 11. The wireless communication device 10-3 according to the third embodiment is added with the route information memory portion 11 configured to memorize route information.

In the third embodiment, IPv6 Routing Protocol for Low Power and Lossy Networks (RPL) is used to perform a route control for a topology of a wireless multi-hop network. Such a case will particularly be described as an example that utilizes a method referred to as a storing-mode where the wireless communication devices (nodes) 10 each store route information of its parent node and route information of its child nodes to perform the route control.

The collection portion 4 according to the third embodiment uses the route information to identify information about a parent node communicating with its own node and information about child nodes communicating with its own node, for example. The collection portion 4 then further collects a count of the child nodes, as the forwarding load information.

The determination portion 5 according to the third embodiment determines a degree of forwarding priority based on the count of the child nodes communicating with its own node and the forwarding count described above, for example. Specifically, the determination portion 5 lowers the degree of forwarding priority as the count of the child nodes is greater, because the more the count of the child nodes, the higher the possibility that more normal forwarding processing (for example, forwarding of data that the child nodes have collected) occurs. For example, the determination portion 5 may record, each time the route information is updated, an increase or a decrease of the count of the child nodes to estimate, based on the increase or the decrease, whether the forwarding count tends to increase. The determination portion 5 may then perform a control of lowering the degree of forwarding priority if the forwarding count tends to increase.

Example of Wireless Communication Method

Figure 8:
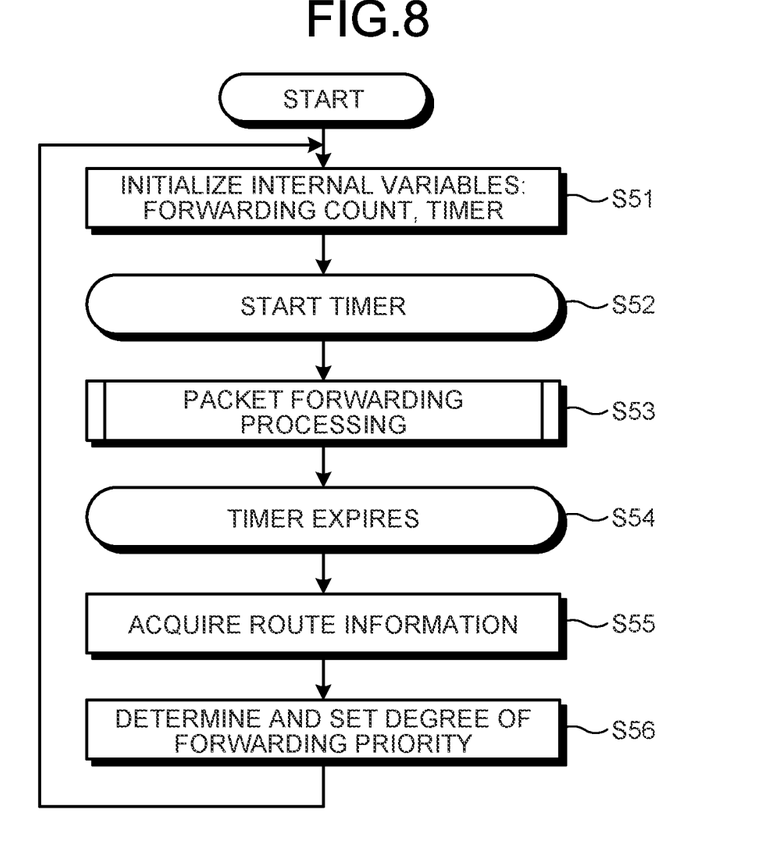
FIG. 8 is a flowchart illustrating an example of an overall flow of a wireless communication method according to the third embodiment.

FIG. 8 is a flowchart illustrating an example of an overall flow of a wireless communication method according to the third embodiment. The descriptions of Steps S51 to S53 are similar to the descriptions of Steps S1 to S3 according to the first embodiment (see FIG. 3), and are thus omitted.

As the timer that has started under the processing at Step S52 expires (Step S54), the determination portion 5 acquires the route information described above (Step S55) to identify, based on the route information, information of the child nodes communicating with its own node. Next, the determination portion 5 determines the degree of forwarding priority X based on a forwarding count that is counted within the period of time that the timer has set and the information of the child nodes, and sets the degree of forwarding priority X in the forwarding control portion 3 (Step S56).

As described above, the third embodiment, where information of child nodes identified from the route information is further used, makes it possible to determine a degree of forwarding priority at a further higher degree of certainty, compared with a degree of forwarding priority that is determined when only a forwarding count is used.

Fourth Embodiment

Next, a fourth embodiment will be described. In the description of the fourth embodiment, those similar to the first embodiment are omitted, but differences from the first embodiment are described. In the fourth embodiment, the collection portion 4 collects forwarding load information by using not only a forwarding count but also schedule information.

Example of Functional Configuration

Figure 9:
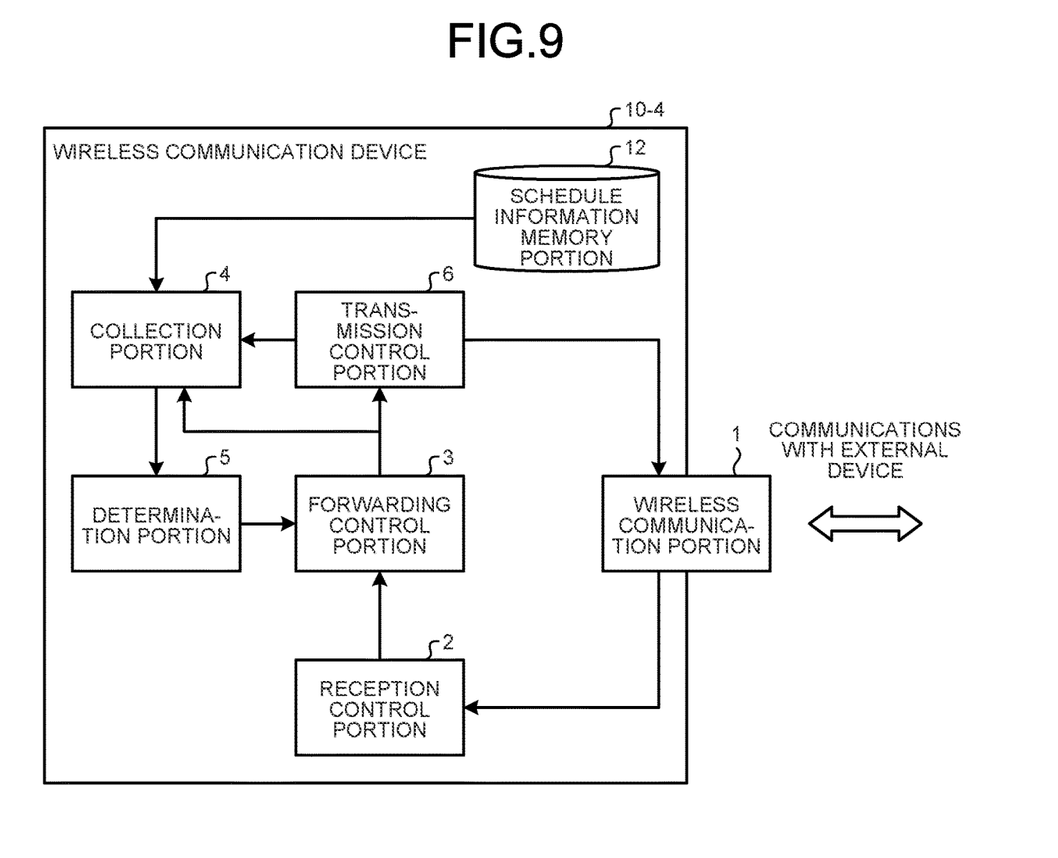
FIG. 9 is a diagram illustrating an example of a functional configuration of a wireless communication device according to a fourth embodiment.

FIG. 9 is a diagram illustrating an example of a functional configuration of a wireless communication device 10-4 according to the fourth embodiment. The wireless communication device 10-4 according to the fourth embodiment includes the wireless communication portion 1, the reception control portion 2, the forwarding control portion 3, the collection portion 4, the determination portion 5, the transmission control portion 6, and a schedule information memory portion 12. The wireless communication device 10-4 according to the fourth embodiment is added with the schedule information memory portion 12 configured to memorize schedule information of a communication control.

In the fourth embodiment, the wireless communication devices (nodes) 10 adjacent to each other each perform a communication control in a Media Access Control (MAC) layer with a communication control method called as Time Synchronized Channel Hopping (TSCH).

The collection portion 4 according to the fourth embodiment identifies the communication status between the wireless communication devices (nodes) 10 adjacent to each other, such as reception slots indicating reception timings of its own node, by using, for example, the schedule information conforming to the TSCH. The collection portion 4 then further collects a count of the reception slots, as the forwarding load information.

The determination portion 5 according to the fourth embodiment determines a degree of forwarding priority based on, for example, the count of the reception slots and the forwarding count described above. Specifically, the determination portion 5 lowers the degree of forwarding priority as the count of reception slots is greater, because the more the count of reception slots, the more the normal forwarding processing (for example, communications for collecting data, including forwarding of data that the child nodes have collected) occurs. For example, the determination portion 5 may record, each time the schedule information is updated, an increase or a decrease of the count of the reception slots to estimate, based on the increase or the decrease, whether the forwarding count tends to increase. The determination portion 5 may then perform a control of lowering the degree of forwarding priority if the forwarding count tends to increase.

Example of Wireless Communication Method

Figure 10:
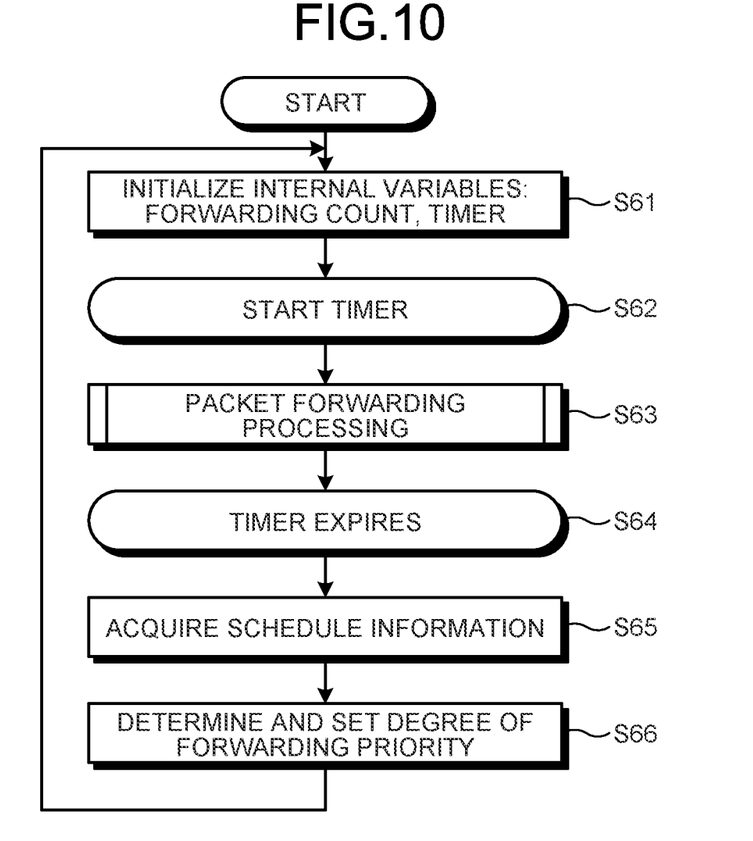
FIG. 10 is a flowchart illustrating an example of an overall flow of a wireless communication method according to the fourth embodiment.

FIG. 10 is a flowchart illustrating an example of an overall flow of a wireless communication method according to the fourth embodiment. The descriptions of Steps S61 to S63 are similar to the descriptions of Steps S1 to S3 according to the first embodiment (see FIG. 3), and are thus omitted.

When the timer that has started under the processing at Step S62 expires (Step S64), the determination portion 5 acquires the schedule information described above (Step S65) and identifies, from the schedule information, information about reception slots of its own node. Next, the determination portion 5 determines the degree of forwarding priority X based on a forwarding count that is counted within the period of time that the timer has set and the information about the reception slots, and sets the degree of forwarding priority X in the forwarding control portion 3 (Step S66).

As described above, the fourth embodiment, where the schedule information storing the communication status between the wireless communication devices 10 adjacent to each other is further used, makes it possible to determine a degree of forwarding priority at a further higher degree of certainty, compared with a degree of forwarding priority that is determined when only a forwarding count is used.

Finally, an example of a hardware configuration of the node 10 according to the first to fourth embodiments will be described.

Example of Hardware Configuration

Figure 11:
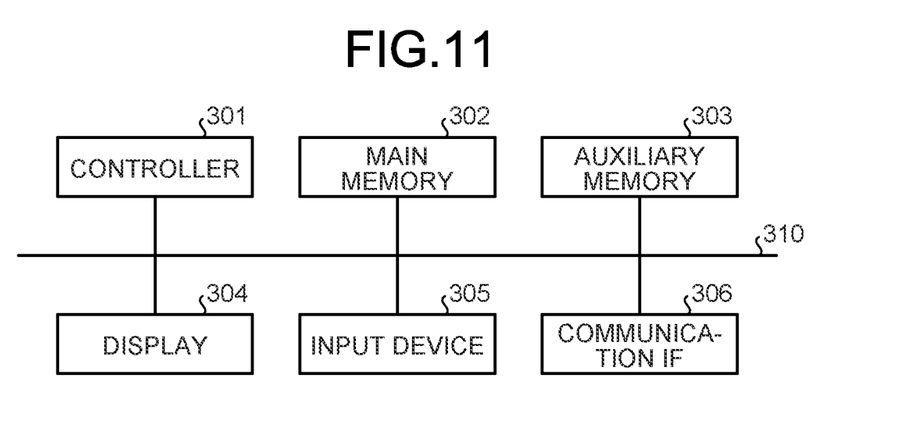
FIG. 11 is a diagram illustrating an example of a hardware configuration according to the first to fourth embodiments.

FIG. 11 is a diagram illustrating an example of the hardware configuration of the wireless communication device 10 (10-2, 10-3, 10-4) according to the first to fourth embodiments. The wireless communication device 10 includes a controller 301, a main memory 302, an auxiliary memory 303, a display 304, an input device 305, and a communication interface (IF) 306. The controller 301, the main memory 302, the auxiliary memory 303, the display 304, the input device 305, and the communication IF 306 are connected with each other via a bus 310.

The controller 301 is a hardware processor that executes a computer program read out from the auxiliary memory 303 to the main memory 302. The main memory 302 is a memory such as a read only memory (ROM) or a random access memory (RAM). The auxiliary memory 303 is a hard disk drive (HDD) or a memory card, for example.

The display 304 is configured to display, for example, a state of the wireless communication device 10. The display 304 is a liquid crystal display, for example. The input device 305 serves as an interface used to operate the wireless communication device 10. The input device 305 includes buttons provided on a housing of the wireless communication device 10, for example. Note that a touch panel having a display function and an input function may be used to achieve the display 304 and the input device 305, for example. The wireless communication device 10 may not include the display 304 and the input device 305.

The communication IF 306 serves as an interface for making communications with the other wireless communication devices 10 and an external device, for example.

The computer program to be executed by the wireless communication device 10 may be stored in a non-transitory computer-readable recording medium, such as a compact disc-read only memory (CD-ROM), a memory card, a compact disc-recordable (CD-R), or a digital versatile disc (DVD), as a file in an installable format or an executable format, and is provided as a computer program product.

Such a configuration may be applied that the computer program that the wireless communication device 10 executes is stored on a computer connected to a network such as the Internet, and is downloaded via the network for provision. Such a configuration may otherwise be applied that the computer program that the wireless communication device 10 executes is not downloaded for provision, but is provided via a network such as the Internet.

Such a configuration may also be applied that the computer program that the wireless communication device 10 executes is installed beforehand in a ROM for provision, for example.

The computer program that the wireless communication device 10 executes has a module configuration including functional blocks that the computer program is also able to achieve, among the functional blocks in FIGS. 2, 5, 7, and 9 described above. As for the functional blocks, the controller 301 serving as actual hardware reads and executes the computer program from the storage medium. The functional blocks described above are then loaded on the main memory 302 serving as actual hardware. That is, the functional blocks described above are generated on the main memory 302.

The functional blocks described above may not be partially or wholly achieved in the form of software, but may be partially or wholly achieved in the form of hardware, such as an integrated circuit (IC).

When a plurality of processors are used to achieve the functions, the processors may each achieve one of the functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication device comprising:
one or more hardware processors configured to:
    collect forwarding load information about wireless communications in a wireless multi-hop network;
    determine, based on the forwarding load information, a degree of forwarding priority for a packet corresponding to a forwarding determination target;
    perform a forwarding control such that the packet corresponding to the forwarding determination target is forwarded earlier as the degree of forwarding priority is higher;
    when the packet corresponding to the forwarding determination target is forwarded, transmit the packet corresponding to the forwarding determination target by multi-cast communications or broadcast communications;

count, for a predetermined period of time, a packet transmission count in the wireless communication device to collect the packet transmission count as the forwarding load information; and determine to lower the degree of forwarding priority as the packet transmission count is greater.

2. The device according to claim 1, wherein the packet corresponding to the forwarding determination target is a packet to be transmitted by multi-cast communications or broadcast communications in a predetermined communication direction.

3. The device according to claim 1, wherein the one or more hardware processors configured to:

count, for a predetermined period of time, a packet forwarding count of packets received from other wireless communication devices to collect the packet forwarding count as the forwarding load information; and determine to lower the degree of forwarding priority as the packet forwarding count is greater.

4. The device according to claim 1, wherein the one or more hardware processors configured to:

hold forwarding of the packet corresponding to the forwarding determination target as the degree of forwarding priority is lower;

determine whether a count of packets, each being identical to the packet corresponding to the forwarding determination target and being received while holding the forwarding of the packet corresponding to the forwarding determination target, is below a threshold; and, in response to determining that the count of the packets is below the threshold, transmit the packet corresponding to the forwarding determination target by multi-cast communications or broadcast communications.

5. The device according to claim 1, wherein the one or more hardware processors configured to:

further collect, as the forwarding load information, a count of child nodes connected to the wireless communication device; and determine the degree of forwarding priority further based on the count of the child nodes to lower the degree of forwarding priority as the count of the child nodes is greater or the count of the child nodes has increased.

6. The device according to claim 1, wherein the one or more hardware processors configured to:

further collect, as the forwarding load information, a count of reception slots indicating reception timings in the wireless communication device; and determine the degree of forwarding priority further based on the count of the reception slots to lower the degree of forwarding priority as the count of the reception slots is greater or the count of the reception slots has increased.

7. The device according to claim 1, wherein the one or more hardware processors configured to limit packets to be transmitted within a certain period of time based on a transmission time limit.

8. A wireless communication system comprising:

a plurality of wireless communication devices constituting a wireless multi-hop network, the wireless communication devices each including one or more hardware processors configured to:

collect forwarding load information about wireless communications in the wireless multi-hop network;

determine whether to be a packet corresponds to a forwarding determination target;

determine, based on the forwarding load information, a degree of forwarding priority for the packet corresponding to the forwarding determination target; and, when the packet corresponding to the forwarding determination target is forwarded, transmit the packet corresponding to the forwarding determination target by multi-cast communications or broadcast communications;

count, for a predetermined period of time, a packet transmission count in the wireless communication device to collect the packet transmission count as the forwarding load information; and determine to lower the degree of forwarding priority as the packet transmission count is greater.

9. A computer program product comprising a non-transitory computer-readable recording medium on which an executable program is recorded, the program instructing a computer to:

collect forwarding load information about wireless communications in a wireless multi-hop network;

determine whether to be a packet corresponds to a forwarding determination target;

determine, based on the forwarding load information, a degree of forwarding priority for the packet corresponding to the forwarding determination target; and, when the packet corresponding to the forwarding determination target is forwarded, transmit the packet corresponding to the forwarding determination target by multi-cast communications or broadcast communications;

count, for a predetermined period of time, a packet transmission count in the wireless communication device to collect the packet transmission count as the forwarding load information; and determine to lower the degree of forwarding priority as the packet transmission count is greater.

* * * * *

UNITED STATES PATENT AND TRADEMARK OFFICE
CERTIFICATE OF CORRECTION

PATENT NO. : 11,706,661 B2
APPLICATION NO. : 17/181540
DATED : July 18, 2023
INVENTOR(S) : Takeshi Sakoda et al.

It is certified that error appears in the above-identified patent and that said Letters Patent is hereby corrected as shown below:

In the Claims

• Claim 3, Column 11, Line 17, "processors configured" should read as --processors are further configured--.

• Claim 5, Column 11, Line 40, "processors configured" should read as --processors are further configured--.

• Claim 6, Column 11, Line 49, "processors configured" should read as --processors are further configured--.

• Claim 7, Column 12, Line 5, "processors configured" should read as --processors are further configured--.

• Claim 8, Column 12, Line 15, "determine whether to be a packet," should read as --determine whether a packet--.

• Claim 9, Column 12, Line 37, "determine whether to be a packet," should read as --determine whether a packet--.

Signed and Sealed this
Twenty-sixth Day of September, 2023

Katherine Kelly Vidal
*Director of the United States Patent and Trademark Office*